US009360315B2

(12) United States Patent
Silberberg (10) Patent No.: US 9,360,315 B2
(45) Date of Patent: Jun. 7, 2016

(54) BUBBLE LEVEL

(71) Applicant: Mark L. Silberberg, Fallbrook, CA (US)

(72) Inventor: Mark L. Silberberg, Fallbrook, CA (US)

( * ) Notice: Subject to any disclaimer, the term of this patent is extended or adjusted under 35 U.S.C. 154(b) by 228 days.

(21) Appl. No.: 14/149,494

(22) Filed: Jan. 7, 2014

(65) Prior Publication Data

US 2014/0373371 A1    Dec. 25, 2014

Related U.S. Application Data (63) Continuation-in-part of application No. 13/925,584, filed on Jun. 24, 2013, now Pat. No. 9,243,907.

(51) Int. Cl.
  *G01C 9/26* (2006.01)
  *G01C 9/28* (2006.01)
(52) U.S. Cl.
  CPC .......................................... *G01C 9/28* (2013.01)
(58) Field of Classification Search
  CPC .............. G01C 9/24; G01C 9/26; G01C 9/28; G01C 9/34
  USPC ........... 33/347, 350, 370, 371, 372, 373, 376, 33/379, 381
  See application file for complete search history.

(56) References Cited

U.S. PATENT DOCUMENTS

| | | | |
|---|---|---|---|
| 2,635,350 A | 4/1953 | Bettega | |
| 2,748,494 A | 6/1956 | Raney | |
| 3,280,670 A * | 10/1966 | Woodling | B25B 13/16 81/101 |
| 3,584,212 A | 6/1971 | Hansen | |
| 3,681,849 A * | 8/1972 | Venables, III | G01C 9/28 33/385 |
| 4,394,799 A * | 7/1983 | Moree | G01C 9/28 33/343 |
| 4,593,475 A | 6/1986 | Mayes | |
| D301,553 S | 6/1989 | Makofsky et al. | |
| 5,103,569 A * | 4/1992 | Leatherwood | G01C 9/32 33/343 |
| D332,226 S | 1/1993 | Hutchins et al. | |
| D355,134 S | 2/1995 | Kennedy | |
| D371,309 S | 7/1996 | Webb | |
| D389,758 S | 1/1998 | Motamed | |
| 5,743,691 A | 4/1998 | Donovan | |
| D395,013 S | 6/1998 | Webb | |
| D409,100 S | 5/1999 | Brimer | |
| D411,470 S | 6/1999 | Webb | |
| D504,834 S | 5/2005 | DeBoer et al. | |
| D538,186 S | 3/2007 | Silberberg | |
| D539,679 S | 4/2007 | Silberberg | |
| D590,280 S | 4/2009 | Allemand | |
| D597,871 S | 8/2009 | Liao | |
| D597,873 S | 8/2009 | Gofer | |
| D613,194 S | 4/2010 | Silberberg | |
| 7,802,372 B1 | 9/2010 | Silberberg | |
| 7,946,045 B2 | 5/2011 | Allemand | |
| D646,597 S | 10/2011 | Allemand | |
| 8,061,051 B2 | 11/2011 | Allemand | |
| D722,511 S * | 2/2015 | Silberberg | D10/69 |

(Continued)

*Primary Examiner* — R. A. Smith
(74) *Attorney, Agent, or Firm* — James E. Brunton (57) ABSTRACT

A bubble type level for determining the orientation of a structure that includes first and second differently oriented bubble vials that are secured within the level body in a manner such that if either of the bubble vials become broken or otherwise damaged, it can be easily replaced and the level need not be discarded. The bubble type level of the invention also includes a novel thumb screw type connector mechanism that enables the level to be removably interconnected with the structures to be leveled, such as conduit. The level further includes a plurality of longitudinally spaced magnets that are connected to various surfaces of the level and a bulls-eye level that is mounted on the top surface of the level body.

18 Claims, 8 Drawing Sheets

(56) References Cited

U.S. PATENT DOCUMENTS

| | | | |
|---|---|---|---|
| D722,897 S * | 2/2015 | Silberberg | D10/69 |
| 2010/0131015 A1 | 5/2010 | Kozak | |
| 2012/0151785 A1 * | 6/2012 | Lettkeman | G01C 9/28 33/301 |
| 2015/0075017 A1 * | 3/2015 | Christianson | G01C 9/28 33/371 |

\* cited by examiner

BUBBLE LEVEL

CROSS-REFERENCE TO RELATED APPLICATIONS

This is a Continuation In Part of co-pending U.S. application Ser. No. 13/925,584 filed Jun. 24, 2013.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed bubble level having replaceable bubble vials and including a novel connector mechanism for releasably connecting the level to the structure to be leveled.

2. Description of Related Art Including Information Disclosed Under 37 CRF 1.97 and 1.98

Bubble levels of various designs have been suggested in the past and are widely used by construction workers to determine the orientation of a particular structure or surface with respect to a reference axis. A typical bubble level generally comprises an elongated body that has a pair of opposing, generally parallel working surfaces and includes a plurality of openings having bubble vials permanently secured therein. The bubble vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a bubble, and the user views the position of the bubble within the vial to determine the position of the tool relative to the working surfaces.

A novel and highly useful level construction is disclosed in U.S. Pat. No. 7,802,372 issued to the present inventor. This patent, which is entitled "Removable Laser Base Attachment for Bubble Levels", describes a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF SUMMARY OF THE INVENTION

It is an object of the present invention to provide a bubble type level for determining the orientation of a structure that includes a plurality of differently oriented bubble vials that are secured within the level body in a manner such that, if any one of the bubble vials become broken, or otherwise damaged, it can be easily replaced and the level need not be discarded.

Another object of the invention is to provide a bubble type level of the aforementioned character in which the bubble vials are securely held in position within threaded chambers formed in the level body by easily removable threaded cap screws.

Another object of the invention is to provide a bubble type level of the character described which includes a novel thumb screw type connector mechanism that enables the level to be removably interconnected with structures to be leveled, such as conduit. In one form of the invention the connector mechanism comprises an elongate, externally threaded structure engaging member that is movable between a first position and a second position and a rotatable, internally threaded finger engaging member that is threadably interconnected with the externally threaded member for moving the member between the first position and a second position in gripping engagement with the conduit.

Still another object of the invention is to provide a bubble type level of the class described that includes a plurality of longitudinally spaced magnets that are connected to the bottom surface of the level so as to permit the level to be conveniently, removably connected to any ferrous structure that is being leveled.

Yet another object of the invention is to provide a bubble type level of the type described in the preceding paragraphs that includes a bulls-eye level that is mounted on the top surface of the level body proximate the center of the level.

These and other objects of the invention will be realized by the level construction illustrated in the drawings and described in the paragraphs that follow.

DETAILED DESCRIPTION OF THE INVENTION

Figures 1, 2, 3, 4, 5:
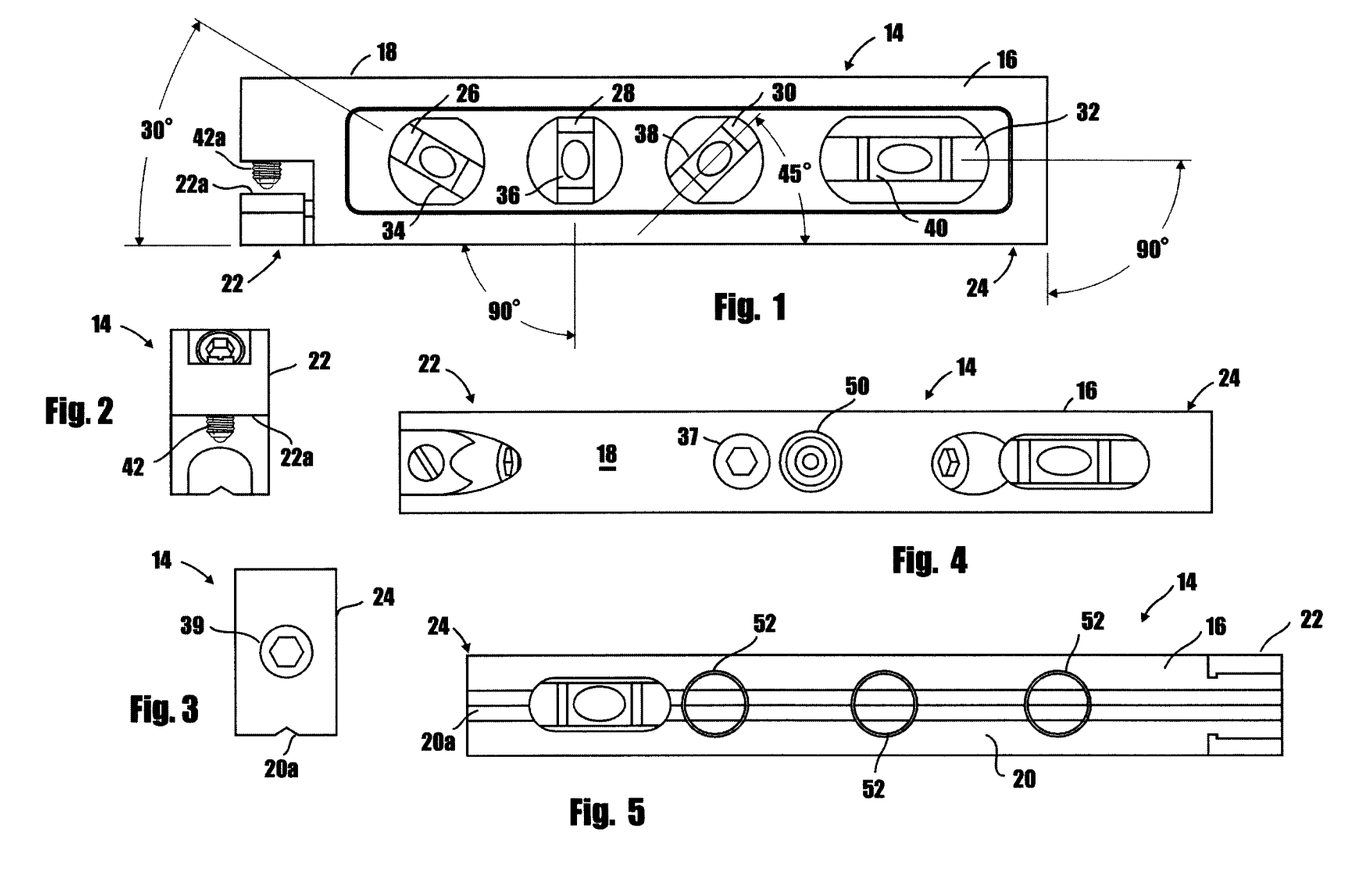
FIG. 1 is a side elevational view of one form of the leveling device of the invention.
FIG. 2 is a left end view of the leveling device shown in FIG. 1.
FIG. 3 is a right end view of the leveling device shown in FIG. 1.
FIG. 4 is a top plan view of the leveling device shown in FIG. 1.
FIG. 5 is a bottom plan view of the leveling device shown in FIG. 1.

Referring to the drawings and particularly to FIGS. 1 through 6, one form of the level of the invention for determining the orientation of a structure is there shown and generally designated by the numeral 14. Level 14 here comprises an elongate body 16 having a top surface 18, a bottom surface 20 and first and second end portions 22 and 24, respectively. For a purpose presently to be discussed, first end portion 22 is provided with a slot 22a. As best seen in FIGS. 3 and 5, bottom surface 20 is provided with a longitudinally extending, generally "V" shaped groove 20a. When the level is used to orient structures such as conduit, the "V"-shaped groove functions to longitudinally align the level with the conduit.

Figure 6:
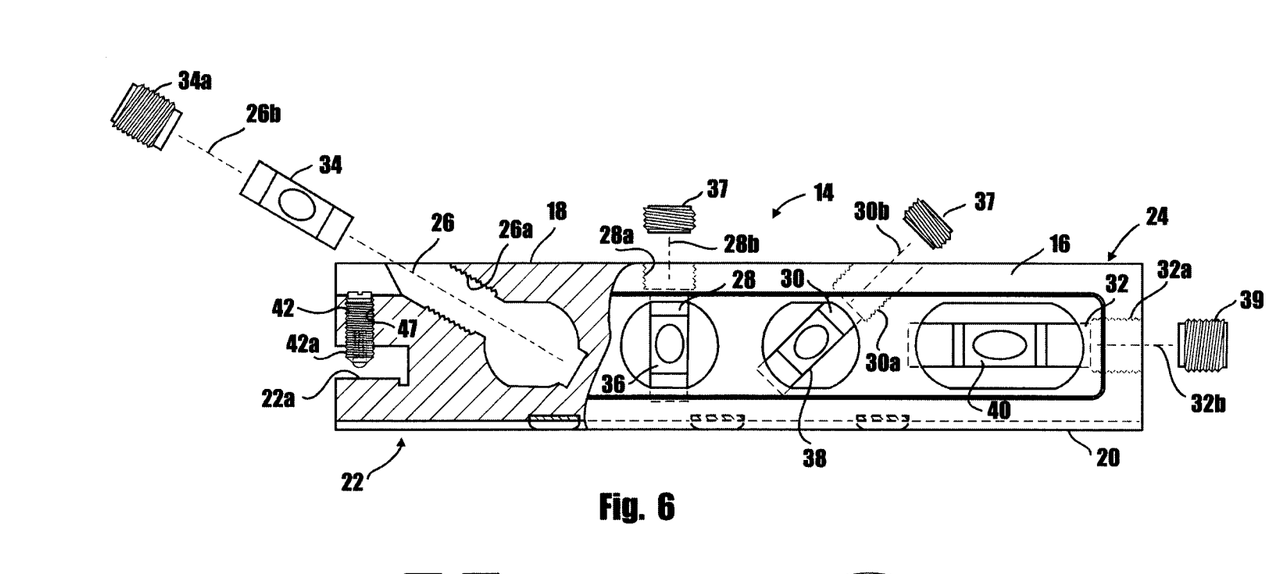
FIG. 6 is a side elevational, exploded view partially in cross-section of the leveling device of the invention.

As best seen in FIGS. 1 and 6 of the drawings, body 16 has a plurality of differently oriented vial chambers 26, 28, 30 and 32. Vial chamber 26 has a threaded end portion 26a and a central axis 26b that is disposed at an angle of approximately 38 degrees with respect to bottom surface 20. Vial chamber 28 has a threaded end portion 28a and a central axis 28b that is disposed at an angle of approximately 90 degrees with respect to bottom surface 20. Vial chamber 30 has a threaded end portion 30a and a central axis 30b that is disposed at an angle of approximately 45 degrees with respect to bottom surface 20. Vial chamber 32 has a threaded end portion 32a and a central axis 32b that is disposed in a generally parallel relationship with bottom surface 20. It is to be understood that the angles of the axes of the central axis of each of the vial chambers can vary depending upon the end use of the improved level.

A conventional bubble vial 34 is disposed within vial chamber 26 and is uniquely removably secured there within by a threaded connector that is threadably receivable within threaded opening 26a of vial chamber 26. The threaded connector, which is here provided in the form of a conventional cap screw 34a (FIG. 6), is moveable between first and second positions to secure the bubble vial 34 within vial chamber 26 (FIG. 1). A conventional bubble vial 36 is disposed within vial chamber 28 and is uniquely removably secured there within by a threaded connector that is threadably receivable within threaded opening 28a of vial chamber 28. The threaded connector, which is also here provided in the form of a conventional cap screw (FIGS. 3 and 6), is moveable between first and second positions to secure the bubble vial 36 within vial chamber 28 (FIG. 1). In similar manner, a conventional bubble vial 38 is disposed within vial chamber 30 and is uniquely removably secured there within by a threaded connector that is threadably receivable within threaded opening 30a of vial chamber 30. Once again, the threaded connector is provided in the form of a conventional cap screw 37 (FIGS. 3 and 6) that is moveable between first and second positions to secure the bubble vial 38 within vial chamber 30 (FIG. 1).

In like manner, as shown in FIG. 1, a conventional bubble vial 40 is disposed within vial chamber 32 and is removably secured there within by a conventional cap screw 39 (FIG. 6) which is moveable between first and second positions to secure the bubble vial 40 within vial chamber 32.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Figure 7:
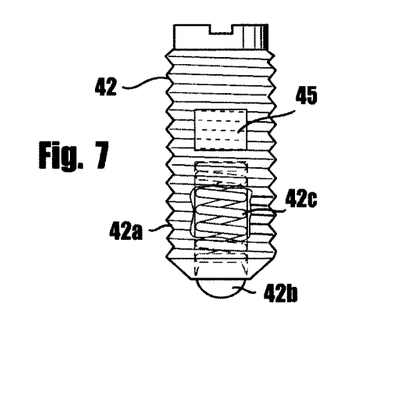
FIG. 7 is a greatly enlarged, side elevational view of the spring-ball-screw component of the leveling device of the invention.

Another highly important feature of the present invention resides in the provision of a connector mechanism for releasably interconnecting body 16 with the structure to be leveled. The connector mechanism, which is here provided in the form of a conventional, self-contained ball-and-spring device 42, is threadably connected to body 16 proximate first end portion 22. As depicted in FIG. 7, the self-contained ball-and-spring device 42 has a threaded shank portion 42a that, when the device is threadably connected to the level body, at least partially extends into slot 22a of the first end portion of the body (FIG. 6). Ball-and-spring device 42 also includes a ball 42b and a biasing spring 42c that are arranged in the manner illustrated in FIG. 7.

As illustrated in FIG. 7, shank portion 42a of the ball-and-spring device 42 includes a nylon patch 45 that functions to prevent the device from accidentally moving within threaded portion 47 of the end portion 22 due to vibration.

Self-contained ball-and-spring devices 42, which are suitable for the present purpose, are readily commercially available from several sources including the Carr Lane Manufacturing Co. of St. Louis, Mo.

Turning now to FIG. 4 of the drawings, another important feature of the present invention resides in the provision of a bulls-eye level 50 that is mounted on the top surface 18 of body 16 proximate the center of the level. Bulls-eye level 50 is readily commercially available from several sources including the Johnson Level & Tool Mfg. Co., Inc. of Mequon, Wis.

Referring to FIG. 5, still another important feature of the present invention resides in the provision of a plurality of longitudinally spaced magnets 52 that are connected to the bottom surface 20 of body 16. In use, these magnets permit the level to be conveniently, removably connected to any ferrous structure that is being leveled. Magnets 52 are readily commercially available from several sources including Applied Magnets of Plano, Tex.

Figure 8:
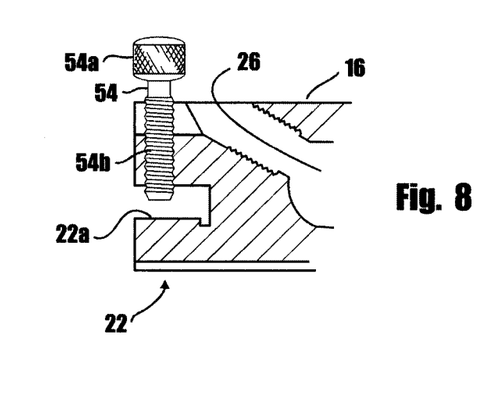
FIG. 8 is a fragmentary, cross-sectional view of the right end portion of an alternate form of the leveling device of the invention.

Turning now to FIG. 8, an alternate form of connector mechanism for releasably interconnecting body 16 with the structure to be leveled is there shown. This alternate form of connector mechanism is provided in the form of a conventional screw 54 that has a knurled head 54a and threaded shank portion 54b. When the device is threadably connected to the level body 16 in the manner shown in FIG. 8, threaded shank portion 54b at least partially extends into slot 22a of the first end portion of body 16.

Referring next to FIGS. 9 through 14, an alternate form of the bubble level of the invention for determining the orientation of a structure is there shown and generally designated by the numeral 64. Level 64 is similar in many respects to the level shown in FIGS. 1 through 8 and like numerals are used in FIGS. 9 through 13 to identify like components.

Figure 11:
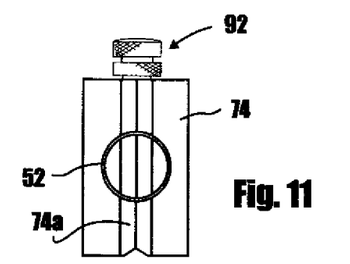
FIG. 11 is a right end view of the leveling device shown in FIG. 9.
Figures 13, 14:
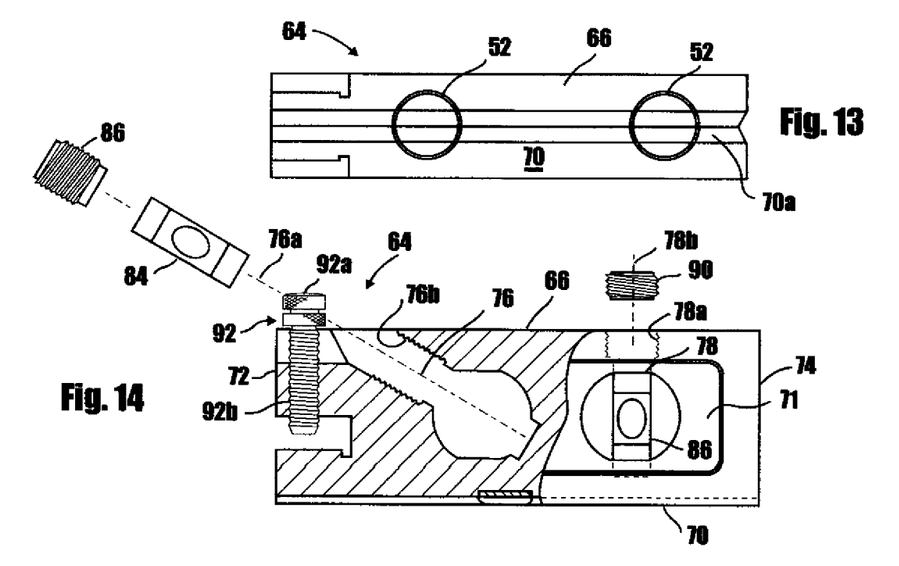
FIG. 13 is a bottom plan view of the leveling device shown in FIG. 9.
FIG. 14 is a side elevational, exploded view partially in cross-section of the leveling device of the embodiment shown in FIG. 9.

Level 64 here comprises an elongate body 66 having a top surface 68, a bottom surface 70, a recessed central portion 71 and first and second end portions 72 and 74, respectively. As before, first end portion 72 is provided with a slot 72a. As best seen in FIG. 13, bottom surface 70 is provided with a longitudinally extending, generally "V" shaped groove 70a. As best seen in FIG. 11, end surface 74 is also provided with a generally "V" shaped groove 74a.

Figure 9:
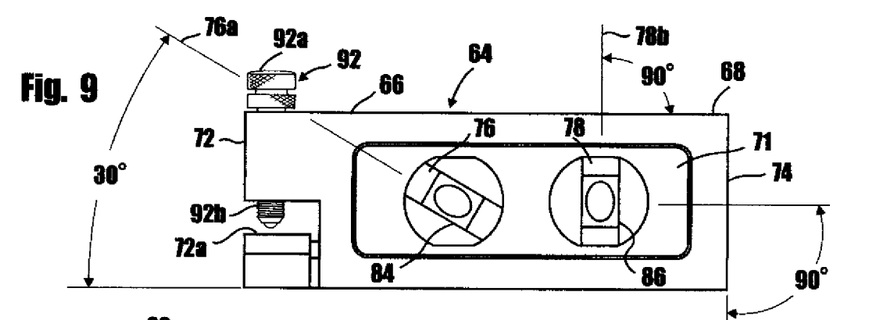
FIG. 9 is a side elevational view of an alternate form of leveling device of the invention.
Figure 10:
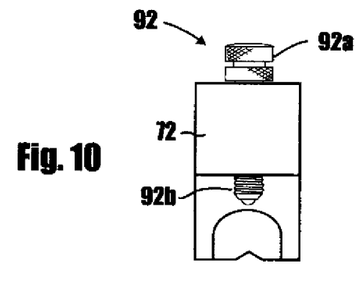
FIG. 10 is a left end view of the leveling device shown in FIG. 9.

As shown in FIG. 9, body 66 has first and second differently oriented vial chambers 76 and 78. First vial chamber 76 has a central axis 76a that is disposed at an angle of approximately 30 degrees with respect to bottom surface 70. Second vial chamber 78 has a threaded end portion 78a and a central axis 78b that is disposed at an angle of approximately 90 degrees with respect to bottom surface 70. It is to be understood that the angles of the axes of the central axis of each of the vial chambers can vary depending upon the end use of the improved level.

A conventional bubble vial 84 is disposed within first vial chamber 76 and is uniquely removably secured there within by a threaded connector that is threadably receivable within a threaded opening 76b of first vial chamber 76. The threaded connector, which is here provided in the form of a conventional cap screw 86 (FIG. 14), is moveable between first and second positions to secure the bubble vial 84 within vial chamber 76 in the manner depicted in FIG. 9. A conventional bubble vial 86 is disposed within second vial chamber 78 and is uniquely removably secured there within by a threaded connector that is threadably receivable within threaded opening 78a of second vial chamber 78. The threaded connector, which is also here provided in the form of a conventional cap screw 90 (FIG. 14), is moveable between first and second positions to secure the bubble vial 86 within vial chamber 78 in the manner depicted in FIG. 9.

With the construction thus described, either or both of the bubble vials of this alternate form of level can be conveniently removed and replaced by simply removing the threaded cap screws from the threaded end portions of the vial chamber and then by removing the bubble vials from their chambers. Unlike the prior art levels, if a given bubble vial is broken or otherwise damaged, it can be easily replaced and the level need not be discarded.

Another highly important feature of this latest form of the invention resides in the provision of a connector mechanism for releasably interconnecting body 66 with the structure to be leveled. The connector mechanism is here provided in the form of a conventional screw 92 that has a knurled head 92a and threaded shank portion 92b. When the device is threadably connected to the level body 66 in the manner shown in FIG. 9, threaded shank portion 92b at least partially extends into slot 72a of the first end portion of body 66. It is to be understood that, if desired, a self-contained ball-and-spring device, such as device 42 can be used instead of screw 92.

Figure 12:
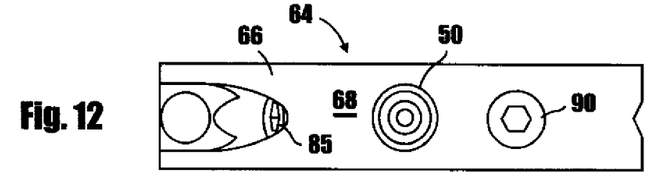
FIG. 12 is a top plan view of the leveling device shown in FIG. 9.

Turning now to FIG. 12 of the drawings, another important feature of this latest form of the invention resides in the provision of a bulls-eye level 50 that is mounted on the top surface 68 of body 66 proximate the center of the level. Bulls-eye level 50, which is substantially identical in construction and operation to that described in connection with the embodiment of FIGS. 1 through 8, is readily commercially available from several sources including the Johnson Level & Tool Mfg. Co., Inc. of Mequon, Wis.

Referring to FIG. 13, still another important feature of the present invention resides in the provision of a plurality of longitudinally spaced magnets 52 that are connected to the bottom surface 70 and to the end portion 74 of body 66 (FIG. 11). In use, these magnets permit the level to be conveniently, removably connected to any ferrous structure that is being leveled. Magnets 52 are readily commercially available from several sources including Applied Magnets of Plano, Tex.

Referring next to FIGS. 15 through 22, still another form of the bubble level of the invention for determining the orientation of a structure is there shown and generally designated by the numeral 94. Level 94 is similar in many respects to the level shown in FIGS. 9 through 14 and like numerals are used in FIGS. 15 through 20 to identify like components.

Figures 20, 20A, 20B, 20C:
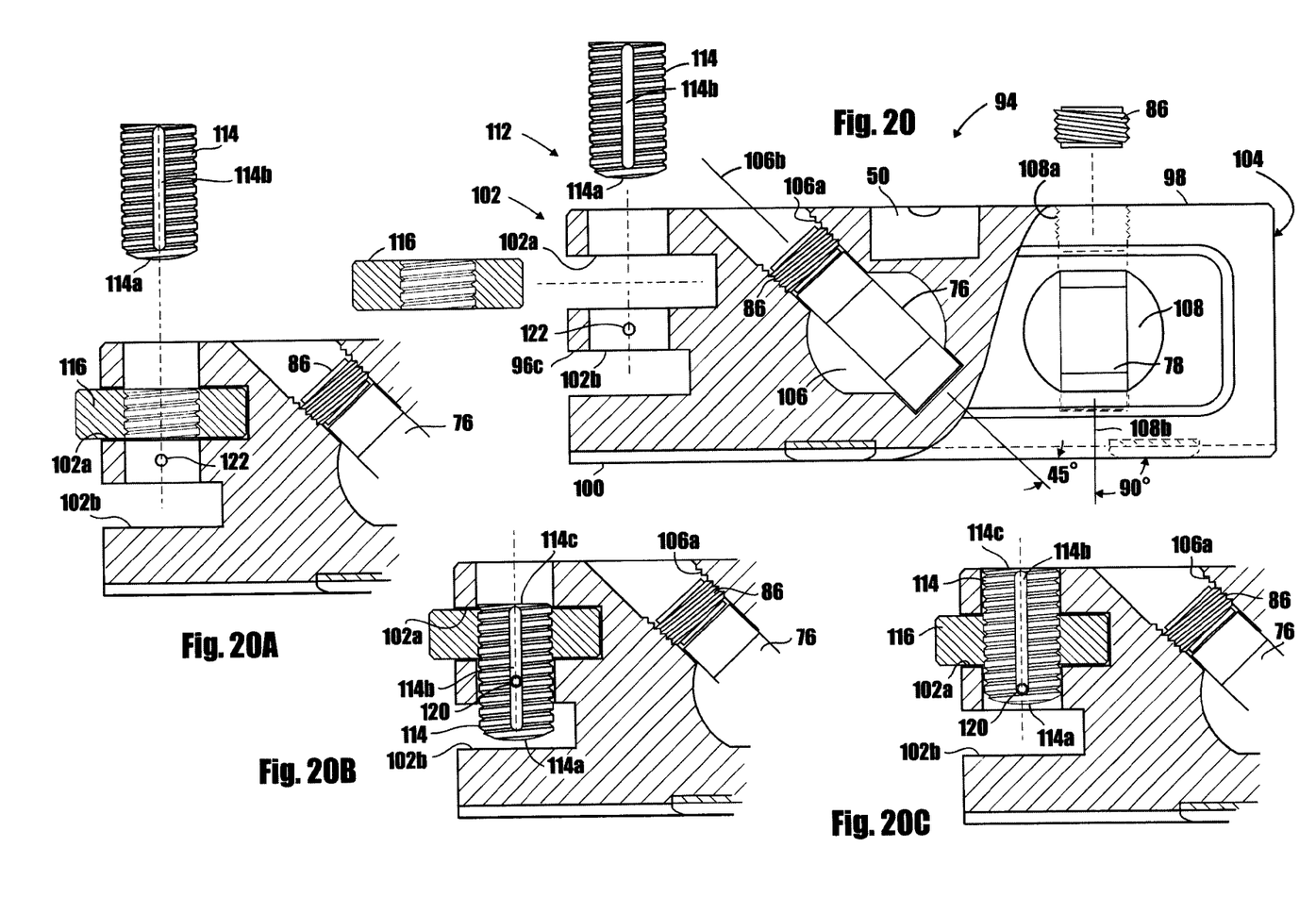
FIG. 20 is a side elevational, exploded view partially in cross-section of the leveling device of the embodiment shown in FIG. 15.
FIG. 20A is a fragmentary, side elevational, exploded view partially in cross-section of the left hand portion of the leveling device shown in FIG. 20, illustrating the thumb screw component in position within the level.
FIG. 20B is a fragmentary, side elevational, exploded view partially in cross-section of the left hand portion of the leveling device shown in FIG. 20, illustrating the thumb screw and structure engaging member components in position within the level and showing the structure engaging member in an advanced position.
FIG. 20C is a fragmentary, side elevational, exploded view partially in cross-section of the left hand portion of the leveling device shown in FIG. 20, illustrating the thumb screw and structure engaging member in position within the level and showing the structure engaging member in a retracted position.
Figure 21:
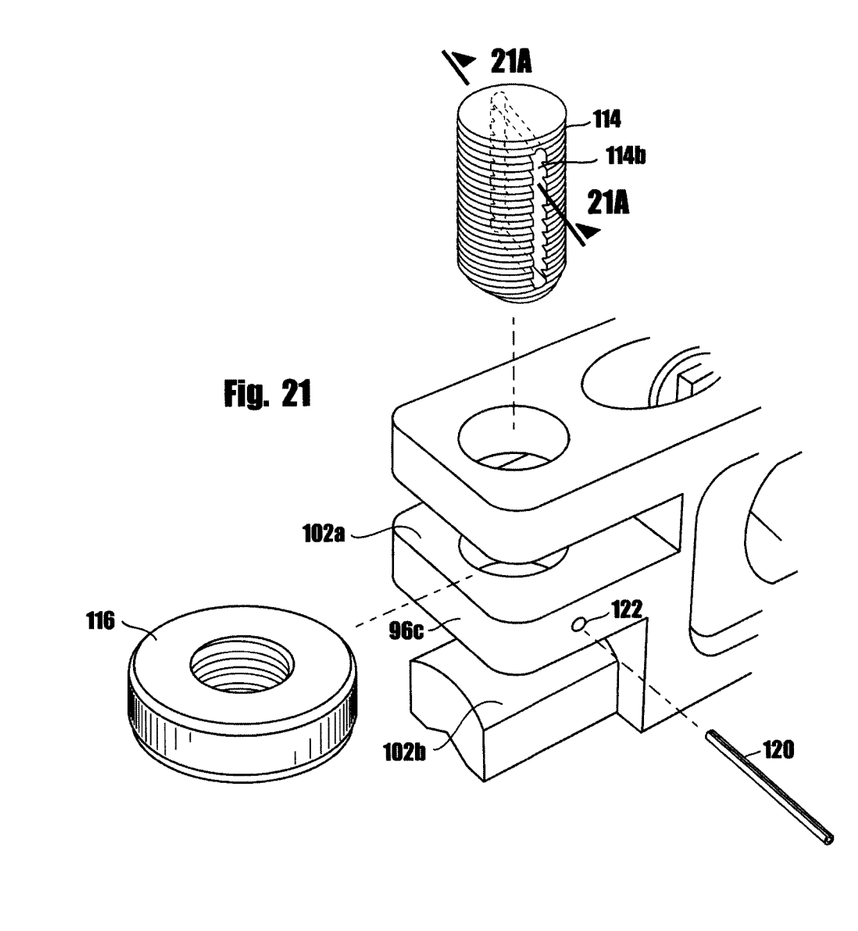
FIG. 21 is a fragmentary, generally perspective exploded view of the left hand portion of the leveling device shown in FIG. 20.
Figure 21A:
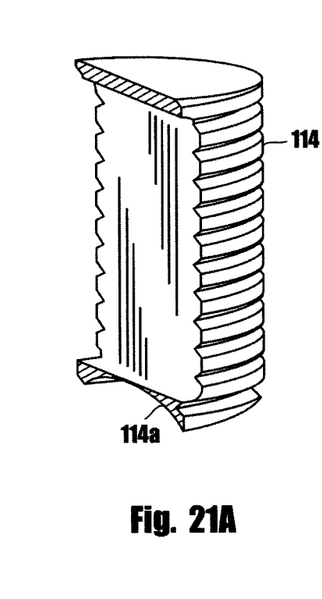
FIG. 21A is an enlarged, generally perspective view taken along lines 21A-21A of FIG. 21

Level 94 here comprises an elongate body 96 having a top surface 98, a bottom surface 100, a recessed central portion 101 and first and second end portions 102 and 104, respectively. As best seen in FIGS. 20 and 21, first end portion 102 is provided with a first slot 102a and a second spaced apart slot 102b. For a purpose presently to be described, bottom surface 100 is provided with a longitudinally extending, generally "V" shaped groove 100a (see FIG. 19) and second end portion 104 is provided with a generally "V" shaped groove 104a (see FIG. 17).

Figure 15:
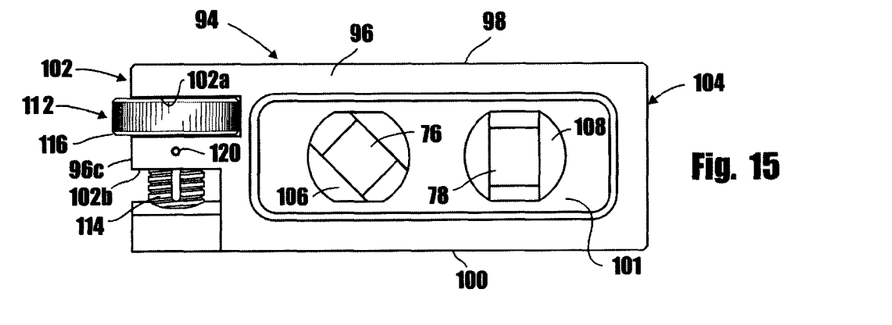
FIG. 15 is a side elevational view of still another form of the leveling device of the invention.
Figure 16:
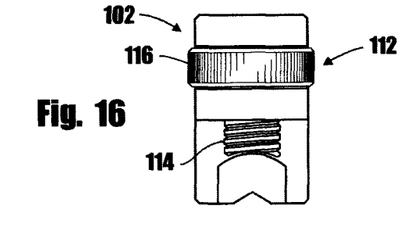
FIG. 16 is a left end view of the leveling device shown in FIG. 15.

As shown in FIGS. 15 and 20, body 96 has first and second differently oriented vial chambers 106 and 108. First vial chamber 106 has a threaded end portion 106a and central axis 106b that is disposed at an angle of approximately 30 degrees with respect to bottom surface 100. Second vial chamber 108 has a threaded end portion 108a and a central axis 108b that is disposed at an angle of approximately 90 degrees with respect to bottom surface 100. It is to be understood that the angles of the axes of the central axis of each of the vial chambers can vary depending upon the end use of the improved level.

A conventional bubble vial 76 is disposed within first vial chamber 106 and is uniquely removably secured there within by a threaded connector that is threadably receivable within a threaded opening 106b of first vial chamber 106. The threaded connector, which is here provided in the form of a conventional cap screw 86 (FIG. 20), is moveable between first and second positions to secure the bubble vial 76 within vial chamber 106 in the manner depicted in FIG. 15. A conventional bubble vial 78 is disposed within second vial chamber 108 and is uniquely removably secured there within by a threaded connector that is threadably receivable within threaded opening 108a of second vial chamber 108. The threaded connector, which is also here provided in the form of a conventional cap screw 86 (FIG. 20), is moveable between first and second positions to secure the bubble vial 78 within vial chamber 108 in the manner depicted in FIG. 15.

With the construction thus described, either or both of the bubble vials of this alternate form of level can be conveniently removed and replaced by simply removing the threaded cap screws from the threaded end portions of the vial chamber and then by removing the bubble vials from their chambers. Unlike the prior art levels, if a given bubble vial is broken or otherwise damaged, it can be easily replaced and the level need not be discarded.

Another highly important feature of this latest form of the invention resides in the provision of a connector mechanism for releasably interconnecting body 96 with the structure to be leveled. This novel connector mechanism 112, which is connected to the first end portion 102 of body 96, comprises an elongate, externally threaded structure engaging member 114 that is movable between a first retracted position (see FIG. 20C) and a second advanced position (see FIG. 20B) wherein the concave end portion 114a can be moved into gripping engagement with the structure "S" to be oriented (see FIG. 22). Connector mechanism 112 also includes an operating member that is operably associated with the structure engaging member for moving the structure engaging member from the first position to the second position. The operating member is here provided in the form of a rotatable, internally threaded finger engaging member 116 that is threadably interconnected with the structure engaging member. Finger engaging member 116, which here comprises a generally circular shaped thumb screw, is rotatably mounted within the first slot 102a formed in the first end portion of body 96. The circumference of the thumb screw is preferably knurled so as to facilitate easy rotation of the thumb screw relative to the externally threaded structure engaging member 114 so as to controllably advance the structure engaging member into the second slot 102b that is formed in the first end portion of body 96 and into engagement with the structure to be oriented.

Figure 22:
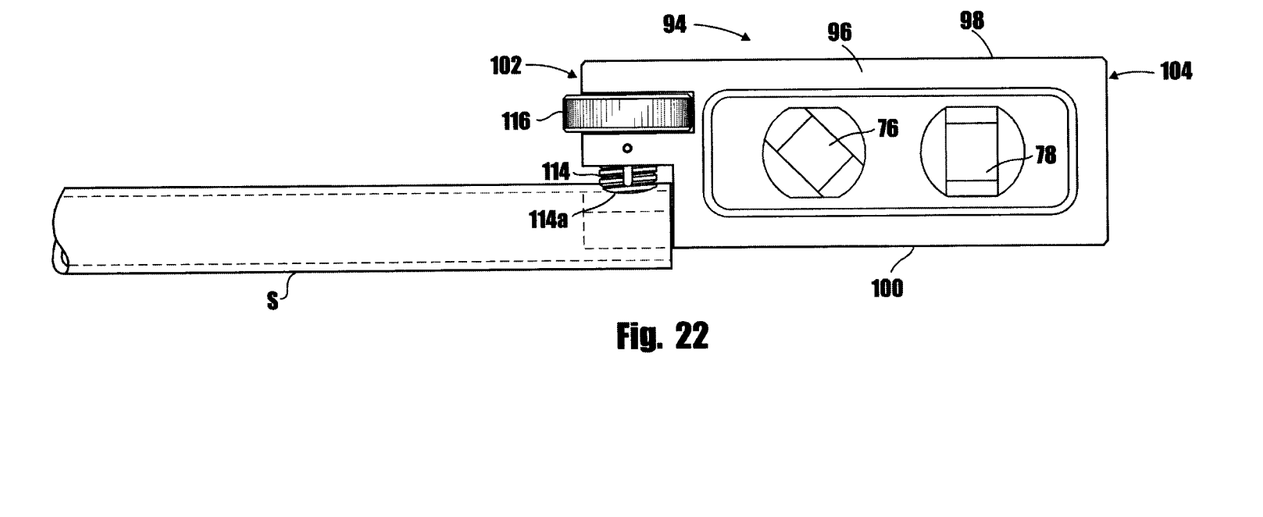
FIG. 22 is a side elevational, view illustrating the leveling device of the embodiment shown in FIG. 15 as it appears when attached to an article being leveled.

As illustrated in FIG. 22, the level of this latest form of the invention is particularly useful for leveling conduit, such as conduit "S". When so used, the end of the conduit is inserted into the second slot 102b in the manner shown in FIG. 22 and is held in position while the thumb screw, or finger engaging member 116 is rotated in a manner to cause the structure engaging member 114 to advance into a position wherein the concave end portion 114a of the structure engaging member moves into secure clamping engagement with the conduit.

As best seen in FIG. 21, structure engaging member 114 is provided with a longitudinally extending slot 114b that closely receives a transversely extending guide member 120 that is operably associated with the structure engaging member. More particularly, as indicated in FIG. 21, guide member 120 is disposed within a transverse bore 122 that extends through an intermediate portion 96c of body 96 that is located in the second end portion 96b of the body between slots 102a and 102b. With this construction, the guide member extends through slot 114b and functions to prevent rotation of the structure engaging member and to guide its travel into slot 102b. As illustrated in FIG. 20C, when the structure engaging member 114 is in its retracted position, the outboard end 114o of the member is advantageously flush with the top surface 98 of the body 96 so as to not obstruct free movement of the level.

Figure 18:
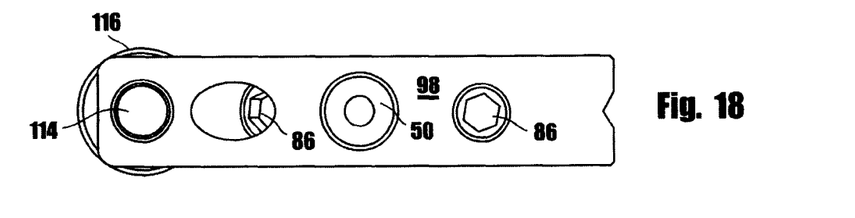
FIG. 18 is a top plan view of the leveling device shown in FIG. 15.

Turning now to FIG. 18 of the drawings, another important feature of this latest form of the invention resides in the provision of a bulls-eye level 50 that is mounted on the top surface 98 of body 96 proximate the center of the level. Bulls-eye level 50 is substantially identical in construction and operation to that described in connection with the previously described embodiments of the invention and is readily commercially available from several sources.

Figure 17:
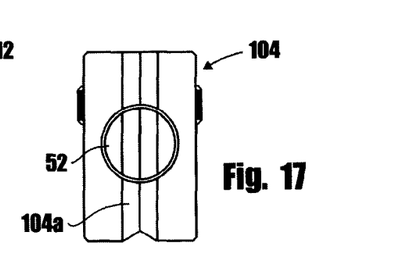
FIG. 17 is a right end view of the leveling device shown in FIG. 15.
Figure 19:
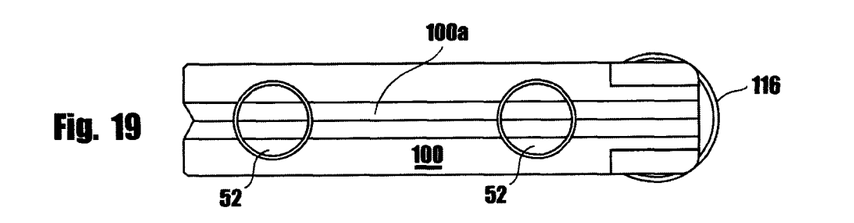
FIG. 19 is a bottom plan view of the leveling device shown in FIG. 15.

Referring to FIG. 19, still another important feature of the present invention resides in the provision of a plurality of longitudinally spaced magnets 52 that are connected to the bottom surface 100 and to the end portion 104 of body 96 (FIG. 17). In use, these magnets permit the level to be conveniently, removably connected to any ferrous structure that is being leveled. When the level is used to orient structures such as a ferrous conduit, the "V"-shaped grooves 100a and 104a function to accurately align the level with the conduit.

Referring next to FIGS. 23 through 28, yet another form of the bubble level of the invention for determining the orientation of a structure is there shown and generally designated by the numeral 124. Level 124 is similar in many respects to the level shown in FIGS. 1 through 6 and like numerals are used in FIGS. 23 through 28 to identify like components.

Figure 25:
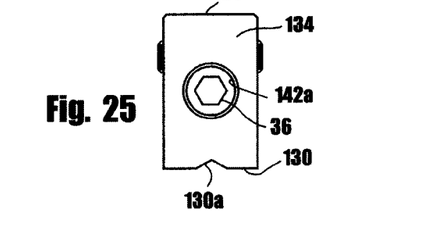
FIG. 25 is a right end view of the leveling device shown in FIG. 23.
Figure 26:
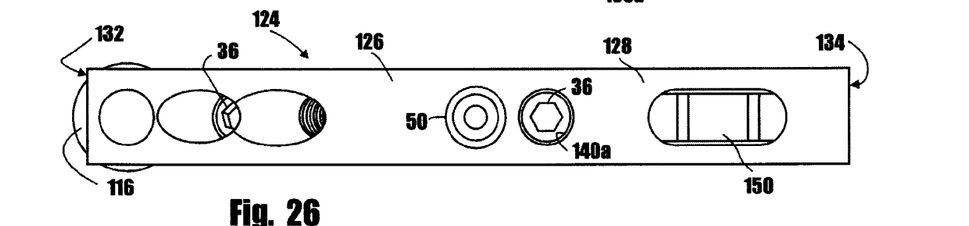
FIG. 26 is a top plan view of the leveling device shown in FIG. 23.
Figure 27:
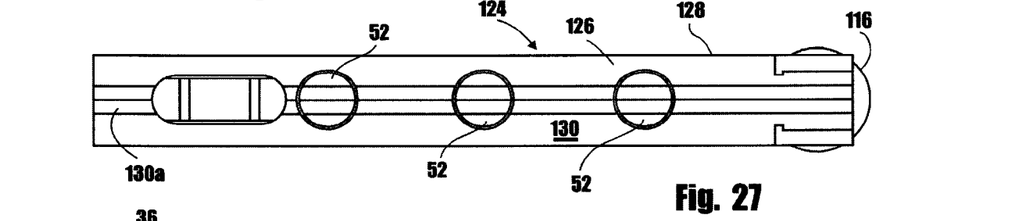
FIG. 27 is a bottom plan view of the leveling device shown in FIG. 23.

Level 124 here comprises an elongate body 126 having a top surface 128, a bottom surface 130 and first and second end portions 132 and 134, respectively. For a purpose presently to be discussed, first end portion 132 is provided with a slot 132a. As best seen in FIGS. 25 and 27, bottom surface 130 is provided with a longitudinally extending, generally "V" shaped groove 130a. When the level is used to orient structures such as conduit, the "V"-shaped groove functions to longitudinally align the level with the conduit.

Figure 23:
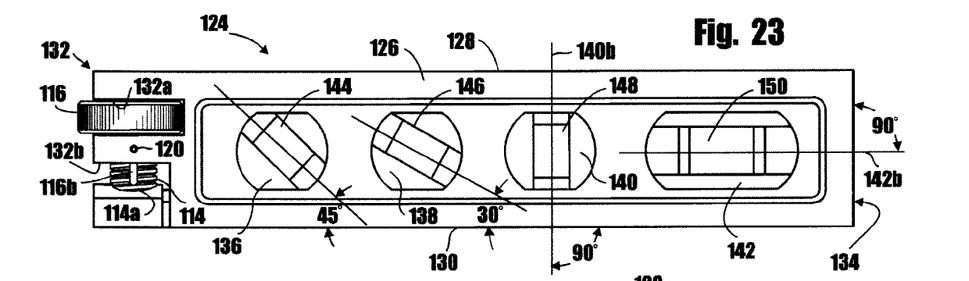
FIG. 23 is a side elevational view of yet another form of leveling device of the invention.
Figure 24:
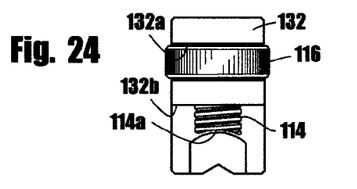
FIG. 24 is a left end view of the leveling device shown in FIG. 23.
Figure 28:
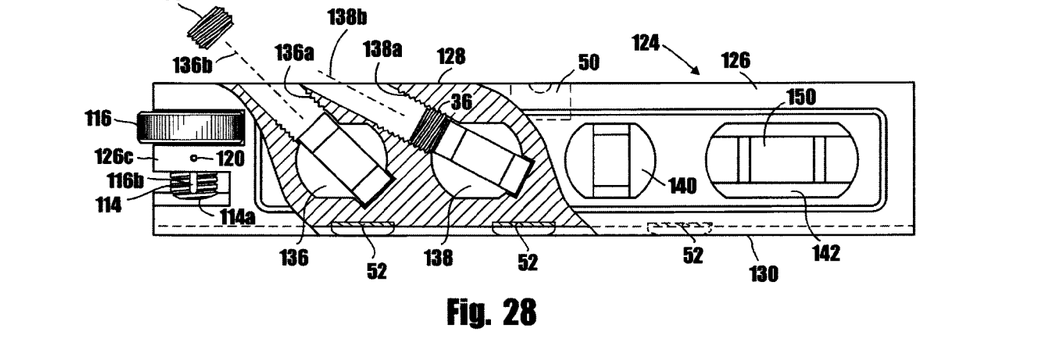
FIG. 28 is a side elevational, exploded view partially in cross-section of the leveling device of the embodiment shown in FIG. 23.

As best seen in FIGS. 23 and 28 of the drawings, body 126 has a plurality of differently oriented vial chambers 136, 138, 140 and 142. Vial chamber 136 has a threaded end portion 136a and a central axis 136b that is disposed at an angle of approximately 45 degrees with respect to bottom surface 130. Vial chamber 138 has a threaded end portion 138a and a central axis 138b that is disposed at an angle of approximately 90 degrees with respect to bottom surface 130. Vial chamber 140 has a threaded end portion 140a (FIG. 26) and a central axis 140b that is disposed at an angle of approximately 30 degrees with respect to bottom surface 130. Vial chamber 142 has a threaded end portion 142a (FIG. 25) and a central axis 142b that is disposed in a generally parallel relationship with bottom surface 130. It is to be understood that the angles of the axes of the central axis of each of the vial chambers can vary depending upon the end use of the improved level.

A conventional bubble vial 144 is disposed within vial chamber 136 and is uniquely removably secured there within by a threaded connector that is threadably receivable within threaded opening 136a of vial chamber 136. The threaded connector, which is here provided in the form of a conventional cap screw 36 (FIG. 28), is moveable between first and second positions to secure the bubble vial 144 within vial chamber 136 (FIG. 23). A conventional bubble vial 146 is disposed within vial chamber 138 and is uniquely removably secured there within by a threaded connector that is threadably receivable within threaded opening 138a of vial chamber 138. The threaded connector, which is also here provided in the form of a conventional cap screw 36, is moveable between first and second positions to secure the bubble vial 146 within vial chamber 138 (FIG. 23). In similar manner, a conventional bubble vial 148 is disposed within vial chamber 140 and is uniquely removably secured there within by a threaded connector that is threadably receivable within threaded opening 140a of vial chamber 140. Once again, the threaded connector is provided in the form of a conventional cap screw 36 that is moveable between first and second positions to secure the bubble vial 148 within vial chamber 140 (FIG. 1).

In like manner, as shown in FIG. 1, a conventional bubble vial 150 is disposed within vial chamber 142 and is removably secured there within by a conventional cap screw 36 which is moveable between first and second positions to secure the bubble vial 150 within vial chamber 142.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Another highly important feature of the present invention resides in the provision of a connector mechanism for releasably interconnecting body 126 with the structure to be leveled. The connector mechanism, which is of similar construction and operation to the connector mechanism of the previously described embodiment of the invention, is connected to the first end portion 132 of body 126, comprises an elongate, externally threaded structure engaging member 114 that is movable between a first retracted position and a second advanced position wherein the concave end portion 114a thereof is in gripping engagement with the structure to be oriented (see FIG. 22). Connector mechanism 112 also includes a rotatable, internally threaded finger engaging member 116 that is threadably interconnected with the structure engaging member for moving the structure engaging member between the first and second positions. Finger engaging member 116, which is here provided in the form of a generally circular shaped thumb screw, is rotatably mounted within the first slot 132a formed in the first end portion of body 126. The circumference of the thumb screw is preferably knurled so as to facilitate easy rotation of the thumb screw relative to the externally threaded structure engaging member 116 so as to controllably advance the structure engaging member into the second slot 132b that is formed in the first end portion of body 126 and into engagement with the structure to be oriented. As before, the level of this latest form of the invention is particularly useful for leveling conduit. When so used, the end of the conduit is inserted into the second slot 132b and is held in position while the thumb screw, or finger engaging member 116 is rotated in a manner to cause the structure engaging member 116 to advance into a position wherein the concave end portion 114a of the structure engaging member moves into secure clamping engagement with the conduit. As in the earlier described embodiment of the invention, structure engaging member 116 is provided with a longitudinally extending slot 116b that closely receives a transversely extending guide member 120 that is operably associated with said threaded member. More particularly, as indicated in FIG. 21, guide member 120 is disposed within a transverse bore 122 that extends through an intermediate portion 126c of body 126 that is located in the second end portion 126b of the body between slots 132a and 132b. With this construction, the guide member extends through slot 116b and functions to prevent rotation of the structure engaging member and to guide its travel into slot 132b. When the structure engaging member 116 is in its retracted position, the outboard end 114c of the member is advantageously flush with the top surface 128 of the body 126 so as to not obstruct free movement of the level.

As in the previously described embodiments of the invention, a bulls-eye level 50 is mounted on the top surface 128 of body 126 proximate the center of the level. Additionally, a plurality of longitudinally spaced magnets 52 are connected to the bottom surface 130 of body 126. In use, these magnets permit the level to be conveniently, removably connected to any ferrous structure that is being leveled.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

The invention claimed is:

1. A level for determining the orientation of a structure comprising:
   (a) a body having a top surface, a bottom surface and first and second end portions, said first end portion having a first slot, said body having at least one vial chamber;
   (b) a bubble vial disposed within said vial chamber of said body; and
   (c) a connector mechanism connected to said body proximate said first end portion thereof for releasably interconnecting said body with the structure, said connector mechanism comprising a structure engaging member comprising a threaded member movable between a first position and a second position and an operating member comprising a rotatable finger engaging member threadably interconnected with said threaded member and receivable within said first slot of said first end portion of said body and being operably associated with said structure engaging member for moving said structure engaging member from said first position to said second position.

2. The level as defined in claim 1 in which said vial chamber has a threaded opening and in which said level further includes a threaded connector receivable within said threaded opening of said vial chamber for movement between first and second positions to secure said bubble vial within said vial chamber.

3. The level as defined in claim 1 in which said threaded member includes a longitudinally extending slot and in which said connector mechanism further includes a transversely extending guide member slidably receivable within said longitudinally extending slot.

4. The level as defined in claim 1 further including at least one magnet connected to said bottom surface of said body.

5. The level as defined in claim 1 further including at least one magnet connected to said second end portion of said body.

6. The level as defined in claim 1 further including a bulls-eye level connected to said top surface of said body.

7. A level for determining the orientation of a structure comprising:
   (a) a body having a top surface, a bottom surface and first and second end portions, said first end portion having a first slot, said body having a plurality of vial chambers;
   (b) a bubble vial disposed within each of said vial chambers of said body; and (c) a connector mechanism connected to said body proximate said first end portion thereof for releasably interconnecting said body with the structure, said connector mechanism comprising:
  (i) an elongate, threaded structure engaging member movable between a first position and a second position; and
  (ii) a rotatable, threaded finger engaging member receivable within said first slot of said first end portion of said body and being threadably interconnected with said elongate threaded structure engaging member for moving said elongate threaded structure between said first and said second position.

8. The level as defined in claim 7 in which each of said vial chambers has a threaded opening and in which said level further includes a threaded connector receivable within each of said threaded openings of said vial chambers for movement between first and second positions to secure said bubble vials within said vial chambers.

9. The level as defined in claim 7 in which said threaded member includes a longitudinally extending slot and in which said connector mechanism further includes a transversely extending guide member slidably receivable within said longitudinally extending slot.

10. The level as defined in claim 9 further including a bulls-eye level connected to said top surface of said body.

11. The level as defined in claim 9 further including at least one magnet connected to said bottom surface of said body.

12. The level as defined in claim 11 in which said bottom surface of said body is provided with a generally V-shaped groove.

13. A level for determining the orientation of a structure comprising:
  (a) a body having a top surface, a bottom surface and first and second end portions, said first end portion having a first slot and a second slot for receiving a portion of the structure, said body including first and second vial chambers, each having a threaded opening;
  (b) a first bubble vial disposed within said first vial chamber;
  (c) a second bubble vial disposed within said second vial chamber;
  (d) a first threaded connector receivable within said threaded opening of said first vial chamber for movement from a first position to a second position in engagement with said first bubble vial to secure said first bubble vial within said first vial chamber;
  (e) a second threaded connector receivable within said threaded opening of said second vial chamber for movement from a first position to a second position in engagement with said second bubble vial to secure said second bubble vial within said second vial chamber; and
  (f) a connector mechanism connected to said body proximate said first end portion thereof for releasably interconnecting said body with the structure, said connector mechanism comprising:
    (i) an elongate, threaded structure engaging member movable between a first position and a second position;
    (ii) a rotatable, threaded finger engaging member receivable within said first slot of said first end portion of said body and being threadably interconnected with said threaded structure engaging member for moving said structure engaging member between said first and second positions; and
    (iii) a transversely extending guide member operably associated with said threaded member.

14. The level as defined in claim 13 in which said structure engaging member includes first and second ends, said second end being provided with a concave structure engaging surface.

15. The level as defined in claim 13 further including a bulls-eye level connected to said top surface of said body.

16. The level as defined in claim 13 further including a plurality of magnets connected to said bottom surface of said body.

17. The level as defined in claim 13 in which said bottom surface of said body is provided with a generally V-shaped groove.

18. The level as defined in claim 13 further including a magnet connected to said second end portion of said body.

* * * * *